United States Patent [19]
Takeuchi et al.

[11] Patent Number: 4,833,537
[45] Date of Patent: May 23, 1989

[54] NOISE REDUCTION CIRCUIT FOR VIDEO SIGNAL HAVING SUITABLE NONLINEAR PROCESSING CHARACTER

[75] Inventors: Motohiko Takeuchi, Yokohama; Masaaki Kisou, Ichikawa, both of Japan

[73] Assignee: Kabushiki Kaisha Toshiba, Kawasaki, Japan

[21] Appl. No.: 136,653

[22] Filed: Dec. 22, 1987

[30] Foreign Application Priority Data

Dec. 22, 1986 [JP]  Japan .............................. 61-304000

[51] Int. Cl.⁴ ............................................. H04N 5/21
[52] U.S. Cl. ....................................... 358/167; 358/36
[58] Field of Search .................... 358/167, 166, 36, 37, 358/136, 336, 340

[56] References Cited

U.S. PATENT DOCUMENTS 4,246,610  1/1981  Takahashi ........................... 358/167
4,275,418  6/1981  Trump et al. ........................ 358/36

FOREIGN PATENT DOCUMENTS 3510213  3/1985  Fed. Rep. of Germany .

OTHER PUBLICATIONS

The Journal of the Institute of Television Engineers of Japan, vol. 33. No. 4, 1979.
*Noise Reducer*, Television Gakkai, vol. 33, No. 4, 1979; The Journal of the Institute of Television Engineers of Japan (with English Translation).

*Primary Examiner*—Tommy P. Chin
*Attorney, Agent, or Firm*—Cushman, Darby & Cushman

[57] ABSTRACT

A noise reduction circuit stores the video signal of one frame as input through an A/D converter from a VTR main body, into a frame memory via a first subtracting circuit. A second subtracting circuit subtracts the delayed video signal delayed one frame, which is derived from said frame memory, from the video signal. The same outputs the subtraction result as a difference signal. The amplitude level of the video signal is detected by the detecting circuit. The nonlinear characteristic appropriate to the difference signal output from the subtracting circuit is selected by the level signal output from the detecting circuit. Subtracting circuit subtracts the noise component selected and extracted by the nonlinear processing circuit from the video signal, thereby to remove the noise component. The video signal with no noise component is applied through a D/A converter from the subtracting circuit, to a CRT display where it is visualized.

9 Claims, 2 Drawing Sheets

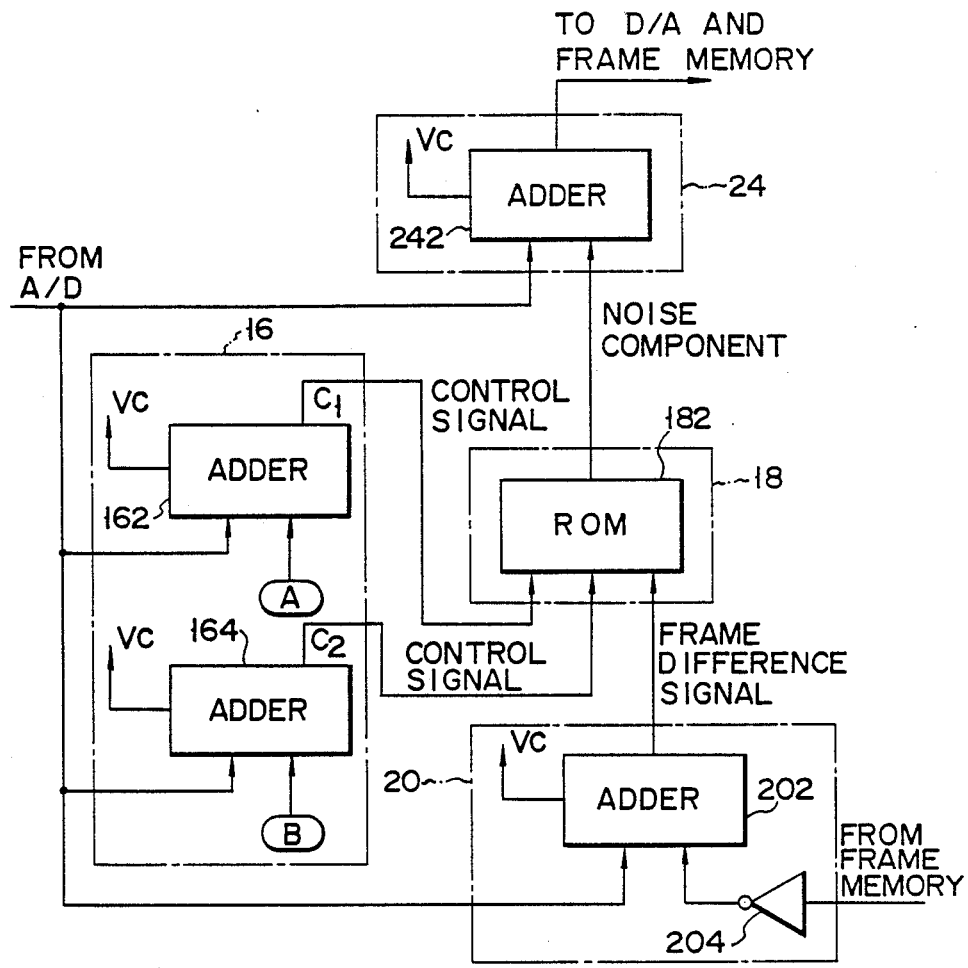
F I G. 3

NOISE REDUCTION CIRCUIT FOR VIDEO SIGNAL HAVING SUITABLE NONLINEAR PROCESSING CHARACTER

BACKGROUND OF THE INVENTION

This invention relates generally to noise reduction circuit and, more particularly to noise reduction circuit for video signals having suitable nonlinear processing character.

By convention, the noise reduction circuit in use with VTR (video tape recorder) employs the subtraction processing of the video signal to remove the noise component contained in the video signal. Specifically, the delayed video signal, which is delayed by one frame time (1/30 sec.) behind the input video signal, is reduced from the video signal, thereby to obtain the difference signal as the result of the subtraction. According to the level of the difference signal, the noise is extracted, i.e., the nonlinear processing is executed. The extracted noise is subtracted from the video signal, to reduce the actual noise component in the video signal.

In the nonlinear processing as mentioned above, the characteristics in the nonlinear processing is modified according to the S/N (signal-to-noise) ratio of the video signal. At the same time, the threshold of the nonlinear processing circuit is modified according to the amplitude level, for example. This improves the S/N to increase the noise removal rate, and minimizes the mixing of the after image in the motion picture portion. The motion picture portion indicates the portion of the picture where the video signal of one frame is different from that of another frame. After this noise reduction process, no noise component, no after-image appears on the reproduced picture. An example of the system for reducing the noise in the video signal is described in "Television Gakkai", Vol., 33, No. 4, "Noise Reducer", 1977.

The noise reducing system described in this paper requires complicated circuitry and algorithm. This implies that the cost to manufacture the system is high.

SUMMARY OF THE INVENTION

Accordingly, an object of this invention is to provide a noise reduction circuit for a video signal having suitable nonlinear processing character, which can reliably reduce the actual noise in the video signal in an inexpensive manner, and can eliminate the actual noise component and the after image, almost perfectly.

According to this invention, there is provided a noise reduction circuit for a video signal having suitable nonlinear processing characteristic, the circuit comprises an A/D converter for converting an input video signal into a digital signal, first subtracting circuit means for subtracting the actual noise component contained in the input video signal from the digital signal of the A/D converter, memory means for storing the output signal of at least one field from the first subtracting circuit means, and for reading out the stored data with delay of a predetermined time of period, second subtracting circuit means for subtracting the data read out of the memory means from the digital signal of the A/D converter, and for outputting the subtraction result as a difference signal, detecting circuit means for detecting the digital signal from the A/D converter and outputting a signal corresponding to the detected level, nonlinear processing circuit means with a plurality of predetermined nonlinear processing characteristic data corresponding to the signal from the detecting circuit means, the nonlinear processing circuit means extracting noise component from the difference signal by the signal from the detecting circuit means, and for outputting it to the first subtracting circuit means, and a D/A converter for converting the digital signal output from the first subtracting circuit means substantial after removal of its actual noise component, into analog signal.

BRIEF DESCRIPTION OF THE DRAWINGS

The manner in which the foregoing and other objects of this invention are accomplished will be apparent from the accompanying specification and claims considered together with the drawings, wherein:

FIG. 3 shows a block diagram illustrating in detail a part of the FIG. 1 circuit.

DETAILED DESCRIPTION OF THE PREFERRED EMBODIMENT

A preferred embodiment of a noise reduction circuit according to this invention will be described referring to the accompanying drawings.

Figure 1:
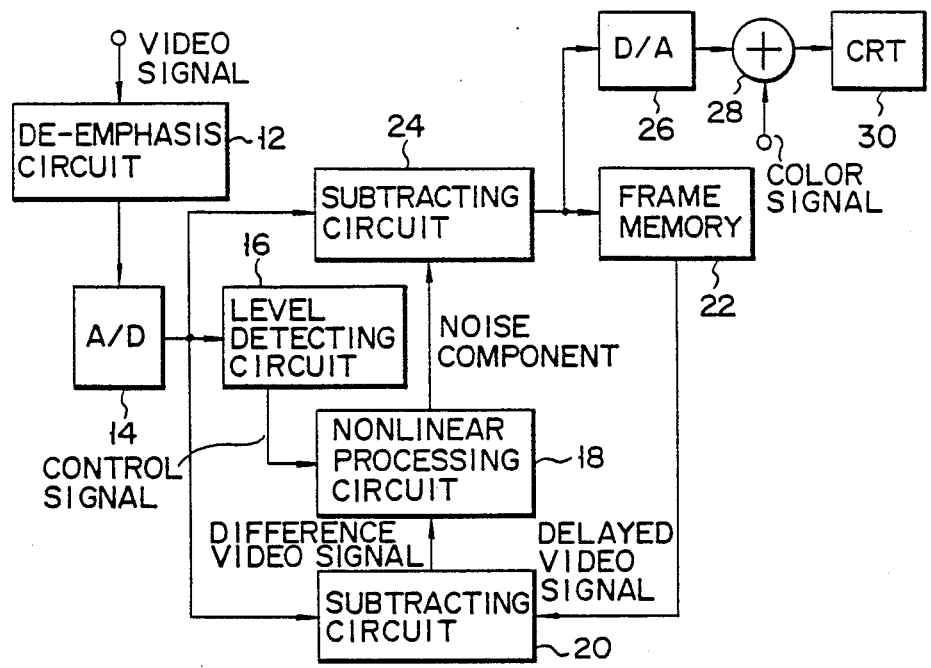
FIG. 1 shows a block diagram showing an embodiment of a noise reduction circuit according to this invention.

FIG. 1 shows a block diagram of a noise reduction circuit for VTR, which is an embodiment of this invention. The video signal output from the main frame of VTR (not shown) is de-emphasized by de-emphasis circuit 12. The de-emphasized video signal is applied to A/D (analog-to-digital) converter 14, where it is digitized. The output signal (intensity signal in this instance) from A/D converter 14 is applied to level detecting circuit 16 where its level is compared with a predetermined level as preset. Level detecting circuit 16 outputs a control signal, which corresponds to an amplitude level of the video signal, to nonlinear processing circuit 18. The video signal output from A/D converter 14 is also output to subtracting circuit 20. In this circuit 20, the delayed video signal read out from frame memory 22 to be given later is subtracted from the video signal, and a difference signal as the result of subtraction is output to nonlinear processing circuit 18.

Figures 2A, 2B, 2C:
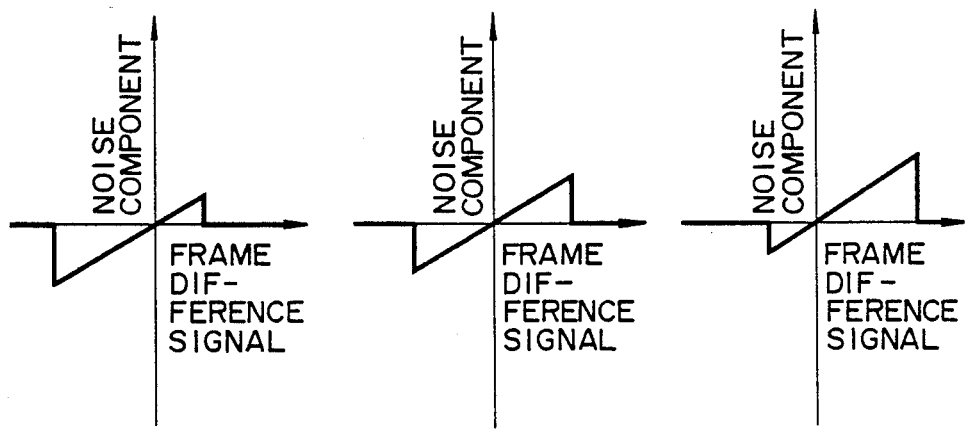
FIGS. 2A, 2B and 2C show graphs diagramatically illustrating the processing characteristics of the nonlinear processing circuit shown in FIG. 1.

Nonlinear processing circuit 18 changes its nonlinear processing characteristic by the control signal, as shown in FIGS. 2A to 2C, and extracts and outputs a noise component from the difference signal. The extracted noise component is output to subtracting circuit 24. This circuit 24 also receives the video signal from A/D converter 14, containing and actual noise component as level detecting circuit 16 and subtracting circuit 20 do so. Subtracting circuit 24 subtracts the extracted noise component from the video signal, to substantially actual remove noise from the video signal. The video signal with substantially no noise is output to frame memory 22 and D/A (digital-to-analog) converter 26, from subtracting circuit 24. Frame memory 22 stores one frame of video signal, and reads out the video signal after delaying the video signal by the time length of one frame, and produces a delayed video signal. Thus, the delayed video signal produced from the frame memory 22 is delayed by one frame.

The video signal input to D/A converter 26 is input to D/A converter 26, and there is converted into an analog signal. The converted analog signal, together with the color signal from the head of the main frame (not shown), is output to adder 28. Adder 28 adds together the video signal and the color signal, and outputs it as an output video signal to CRT display 30.

The operation of the noise reduction system thus arranged will be described. The input video signal output from the VTR main frame via de-emphasis circuit 12 is applied to A/D converter 14, and subtracting circuits 20 and 24, and level detecting circuit 16. Subtracting circuit 20 is coupled for reception with the delayed video signal, which is derived from frame memory 22, and is formed by delaying the video signal output from A/D converter 14, by one frame. Subtracting circuit 20 is comprised of adder 202 and inverter 204, and executes the subtracting operation on the basis of 2' complement. In this circuit, the delayed video signal is subtracted from the video signal. The difference signal as the result of the subtraction is output to nonlinear processing circuit 18.

In the level detecting circuit 16, the amplitude level of the video signal output from A/D converter 14 is compared with a predetermined level as preset. The number of predetermined level may be not only one, but also more than one, if necessary. In the comparison of the video signal with the predetermined level, time varying amplitude level of the video signal or the average amplitude level may be compared with the predetermined level. The average amplitude level can be obtained by integrating the video signal with respect to time for a fixed period of time.

An exemplar level detecting circuit 16 is shown in FIG. 3, and is comprised of two adders 162 and 164. Adder 162 is coupled for reception with the video signal and slice level signal A. Similarly, another adder 164 is coupled for reception with the video signal and another slice level signal B. These slice level signals A and B are formed by slicing the video signal at appropriate level. Assume that slice level signals A and B are related by A>B, and the output signals of adders 162 and 164 are denoted as $C_1$ and $C_2$, respectively, and the video signal level is V. When $V \leq B$, $C_1$ and $C_2$ are both "0", when $A \leq V < B$, $C_1$ is "0" and $C_2$ is "1", and when $A < V$, $C_1$ and $C_2$ are both "1". The output signal of "1" or "0" is applied as a control signal to nonlinear processing circuit 18 as a ROM (read only memory), for example.

The nonlinear processing circuit 18 changes its characteristic as shown in FIGS. 2A to 2C according to the input control signal, and extracts the extracted noise component for transmission to subtracting circuit 24. Nonlinear processing circuit 18 is ROM 182, as mentioned earlier. The nonlinear processing circuit 18, coupled with the difference signal and the control signal, produces an output signal as given by the input address applied thereto. FIGS. 2A to 2C show graphically the processing characteristics (input/output characteristics) of linear processing circuit 18, by way of example. In the graphs, the abscissa represents the difference signal, and the ordinate represents the extracted noise component. In FIG. 2A, the difference signal is large in the negative (darker) direction. In FIG. 2B, the signals in both the positive and negative directions are large. In FIG. 2C, the signal is large in the positive (brighter) direction. In operation, nonlinear processing circuit 18 selects one of those characteristics of FIGS. 2A to 2C based on the amplitude level of the video signal. This selection is made by the control signals $C_1$ and $C_2$ as the outputs of adders 162 and 164. That is, based on the difference signal from subtracting circuit 20, nonlinear processing circuit 18 selects one of the characteristics of FIGS. 2A to 2C by control signals $C_1$ and $C_2$, and extracts the noise component. The extracted noise component is output to subtracting circuit 24.

Generally, the video signal contains the image data repeated at the frame periods. Therefore, the correlation between frames is high. On the other hand, the noise component in the video signal has a low correlation. Therefore, the difference signal consists of the video signal (motion picture portion) with low correlation and the extracted noise component. In the difference signal, the extracted noise component is small in amplitude level, while the video signal component is high. Therefore, when the difference signal input to nonlinear processing circuit 18 is larger than a predetermined level as preset, the circuit 18 extracts the extracted noise component with its output of logical "0", from the difference signal.

The input/output characteristic of the nonlinear processing circuit 18 becomes asymmetrical according to the positive and negative amplitudes of the difference signal, as shown in FIGS. 2A and 2C. The reasons for this will be described. (1) Generally, the visual sense of a human being to the noise on the display screen for the same amplitude differs with the brightness (amplitude of the video signal) on the screen of CRT display 30. The noise is most remarkable when the noise amplitude is 30 to 50% of the signal amplitude. (2) If the gain of the nonlinear circuit is greater than the normal value, in order to increase the noise reduction effect, the called after-image occurs to degrade the picture quality. For the above reasons (1) and (2), the following measure has been taken. The circuit is so set that in the amplitude level range with remarkable noise, the noise reduction effect is more intensive than the after-image reduction effect, while in the remaining range, the latter is more intensive than the former. To this end, the characteristic of the nonlinear processing circuit is asymmetrical.

The noise appearance depends on the positive or negative polarity of the noise component of the video signal, viz., whether the original video signal becomes brighter or darker by the noise. In the case of the video signal of a high luminance, the darker noise more remarkably appears than the brighter noise. On the other hand, in the case of the video signal of a low luminance, the brighter noise is greater than the darker noise. Therefore, for the more prominent noise, it is desirable that the noise reduction effect be more intense than the after-image reduction effect, even if a slight amount of the after-image is left. For the less prominent noise, it is desirable that the after-image reduction effect be more intense than the noise reduction effect. To this end, the nonlinear characteristic of the nonlinear processing circuit is varied as shown in FIGS. 2A to 2C according to the positive or negative polarity of the difference signal and the amplitude level of the video signal.

In subtracting circuit 24, the extracted noise component is subtracted from the video signal input to the subtracting circuit 24. This circuit 24, which is made up of adder 242, removes the extracted noise component from the video signal through the subtracting operation, and outputs the video signal with no substantially noise to the D/A converter 26 subsequent to the subtracting circuit 24, and loads it to frame memory 22. Adders 162, 164, 202 and 242 are coupled with power source, e.g., 5 V. Nonlinear circuit 18 and subtracting circuit 24 are interrelated with each other as follows. When the extracted noise component as input to subtracting circuit 24 takes a positive value, nonlinear processing circuit 18 outputs the 2' complement of that positive value. When the extracted noise component takes a negative value, it outputs its absolute value. This is realized in a manner that such values are prestored in the ROM 182 of nonlinear processing circuit 18, and is read out and output in the above way.

The video signal written into frame memory 22 is read out with one frame delay of the present input video signal. The video signal as read out is output as the delayed video signal to subtracting circuit 20.

The video signal output to D/A converter 26 is analized, and output to adder 28. Adder 28 adds together the output video signal and the color signal as output from the head of the VTR (not shown) and processed in another processing system. The video signal with no noise is displayed on the screen of CRT display 30. The video signal whose actual noise component is thus substantially removed is displayed by CRT display 30.

In this embodiment, the processing characteristic of nonlinear processing circuit 18 is varied as shown in FIGS. 2A to 2C, according to the amplitude level of the video signal, thereby to remove the extracted noise component from the difference signal. Therefore, the after-image is minimized and hence the noise component on the display screen can be remarkably reduced, thus ensuring the complete actual noise removal. Level detecting circuit 16 and nonlinear processing circuit 18 can be constructed by simple circuits such as adders 162 and 164, and ROM 182, without a complicated algorithm. The cost to manufacture the circuit with the above-mentioned effects is reduced.

Nonlinear processing circuit 18 can be constructed with a fundamental nonlinear amplifier circuit, and frequently includes the othogonal transform and its reverse transform, and the like. Nonlinear processing circuit 18 may be constructed with a PROM (programmable read only memory) with the nonlinear characteristic between the input and output. In this case, the digitized difference signal as obtained from subtracting circuit 20, is assigned to some addresses of PROM. The digitized control signal as output from level detecting circuit 16 is assigned to the remaining addresses. The memory locations of the PROM as specified by those addresses store predetermined values with nonlinear characteristics, respectively. Therefore, the values as read out from the PROM are those corresponding to the extracted noise components, which are stored in the addresses as defined by the difference signal and the control signal. The value as read out are output to subtracting circuit 24.

In the embodiment as mentioned above, the video signal is used as the intensity signal. If this signal is used as the color signal, the chroma inverter for matching the color phase between the frame signals is only needed to be placed between the output of the frame memory and the subtracting circuit in the FIG. 1 circuit.

Additionally, the frame memory can be replaced by the field memory. The color signal may be the color signal after the luminance/color signal separation or the color difference signal after the decode processing.

What is claimed is:

1. A noise reduction circuit for an input video signal, said circuit comprising:

an A/D converter for converting an input video signal into a digital signal having an actual noise component;

first subtracting circuit means for reducing the actual noise component contained in said input video signal from the digital signal of said A/D converter and for outputting the reduced signal;

memory means for storing the output signal from said first subtracting circuit means, and for reading out said stored output signal with delay of a predetermined time of period;

second subtracting circuit means for second subtracting the stored output signal read out of said memory means from the digital signal of said A/D converter, and for outputting the second subtraction result as a difference signal;

detecting circuit means for detecting the digital signal from said A/D converter, said digital signal having a digital signal level, and said detecting circuit outputting a signal corresponding to the detected digital signal level;

nonlinear processing circuit means with a plurality of predetermined nonlinear processing characteristic data corresponding to the signal from said detecting circuit means, said nonlinear processing circuit means extracting an extracted noise component from said difference signal by the signal from said detecting circuit means, and for outputting it to said first subtracting circuit means, said first subtracting circuit means reducing the actual noise component contained in said input video signal by subtracting the extracted noise component from the digital signal of said A/D converter; and a D/A converter for converting reduced signal from said first subtracting circuit means into an analog signal.

2. A circuit according to claim 1, wherein the output signal supplied to said memory means via the first subtracting circuit means for removing said actual noise component is the same as the digital signal of said A/D converter supplied to said second subtracting circuit means and said detecting circuit means in the case where said extracted noise component generated from said nonlinear processing circuit means is zero.

3. A circuit according to claim 2, wherein said detecting circuit means compares the digital signal generated from said A/D converter with a predetermined level, and generates a signal corresponding to the result of the comparison.

4. A circuit according to claim 3, wherein said detecting circuit means includes a plurality of predetermined levels.

5. A circuit according to claim 4, wherein the digital signal level of said detecting circuit means is an amplitude level.

6. A circuit according to claim 5, wherein said detecting circuit means compares the amplitude level of the digital signal from said A/D converter is compared with a slice level of upper and lower reference values of amplitude of said digital signal and outputs a signal corresponding to the result of the comparison.

7. A circuit according to claim 6, wherein said detecting circuit means includes a plurality of adders, and the output signal of said plurality of adders is output to said nonlinear processing circuit means.

8. A circuit according to claim 7, wherein said nonlinear processing circuit means includes a ROM, said ROM extracting said extracted noise component by selecting said signal from said detecting circuit means based on said difference signal.

9. A circuit according to claim 8, wherein said first subtracting circuit means includes an adder for adding said digital signal and said extracted noise component to produce said output signal, said second subtracting circuit means includes an inverter for inverting the data read out from said memory means, and an adder for adding the data applied through said inverter and said digital signal to provide said difference signal.

* * * * *